United States Patent Office 2,773,889
Patented Dec. 11, 1956

2,773,889

PROCESS FOR THE EXTRACTION OF FATTY OILS AND PROTEINS FROM OLEAGINOUS MATERIALS

Wilson S. Kao, Singapore, Straits Settlement

No Drawing. Application November 29, 1951,
Serial No. 259,004

4 Claims. (Cl. 260—412)

The present invention relates to the extraction of fatty oils and proteins from oleaginous materials of animal or vegetable origin and has for its object to render the process more expeditious and considerably cheaper. Another object of my present invention is to dissolve out any soluble or emulsifiable ingredients, such as carbohydrates, vitamins, or sterols, lipids, pigments, as the case may be, in one single operation, so as to leave nothing but fibres in the tissue or cell structure after its total collapse by the said operation.

According to my invention, the fibrous structure comprising fat or oil, proteins and carbohydrates, the three basic ingredients of all oleaginous materials, is bound to collapse down if not only the fat or oil, but also the proteins and soluble carbohydrates are torn away from the structure simultaneously by a fundamentally different new technique, namely a combined physical and chemical attack, employed in my invention. In other words, the oleaginous materials are to be subject to the force of physico-chemical flooding and bombardment, as distinct from mere application of mechanical pressure or chemical solvent action known hithertofore. In the conventional practice, fatty oil alone is expressed or extracted, and a subsequent separation of proteins and/or carbohydrates from the fat- and oil-free starting materials is required.

Instead of relying on the mechanical pressure or solvent action for the extraction I attain my objects by the employment of an aqueous medium containing required amount of emulsifying agent, such as soap or other suitable emulsifier for edible or industrial purposes, to lacerate the tissue system and ensure the total collapse of the said system.

The gist of my invention is based on the discovery that the emulsifier naturally present in an oleaginous material of animal or vegetable origin is too small in quantity to be relied upon to perform the important functions I have in view. It occurs, therefore, to me that if an aqueous medium containing a water-soluble emulsifying agent, notably a water-soluble soap, is used in sufficient excess to digest the material at a temperature below the coagulation point of the proteins contained therein, for sufficient time until the bond between the fibrous tissues and the dispersible ingredients, including oil or fat, proteins, carbohydrates, is broken, then a temporary emulsion, which is rich in both oil and proteins and which is distinctly different from those obtained by prior art, is formed which may be creamed out by the addition of a creaming agent which tends to eliminate the soap or other emulsifying agent present in the extract. The emulsion looks like a rich milk or thick cream and may be separated from the meal residue by means of vibrating screen or basket centrifuge without difficulty. On standing, the fatty oil will usually float up to the surface, while the proteins in the form of a cream and the carbohydrates may be found in the layer beneath the surface and at the bottom or in the aqueous medium.

First lixiviations in this manner will not bring out all the fat or oil stored in the cells or tissues of the materials, and if the meal residue is dried up and then soaked into a fresh extracting medium, more of the three basic ingredients may be brought out into solution by the soaking or suction action. This alternate drying up and soaking in operation may be repeated several times in order to lacerate the tissue system, and to isolate the fatty oil, proteins and carbohydrates quantitatively. It is worth mentioning that the mere rendering or extraction with an aqueous medium without the aid of an emulsifier will not only result in small yields of fatty oils, proteins and carbohydrates, but also the meal residues as well as the containers will become too oily to be cleansed.

It is well known that sodium or potassium soaps tend to stabilize oil-in-water emulsions, so that soap-stabilized emulsions are usually of the permanent type and it would be unsuitable for my purposes. I have therefore, to use the soap within certain limits so as to avoid the stabilizing action of soap.

In the purification of glyceride oils by synthetic detergents, as wetting or surface active agents, even ordinary alkali metal fatty acid soaps have been mentioned but found unsuitable for use as they tend to cause an excessive amount of oil to be emulsified into the aqueous phase, resulting then in a loss of oil. It must be pointed out that the soaps are distinct in their constitution and properties from so-called synthetic detergents and when applied to materials of even the same origin, not necessarily the same results would be produced. Moreover, the oleaginous materials are not to be confused with the glyceride oils even if the latter are extracted from them.

The prior art has produced oil-in-water emulsions either by the use of dilute aqueous solutions of sodium carbonate, ammonia or other alkalis except caustic soda, which latter might saponify the oil to some extent, resulting in a loss of oil or fat, or by steeping or grinding, to be followed by bruising or macerating, but it is quite apparent that these operations alone will not be able to drive the oil or fat and proteins from the inner parts of tissues and the emulsions thus obtained would be poor in these important ingredients. As a result, the recovery of oil or fat and albuminous matters would not be very efficient or quantitative, as by the lacerating action of an added emulsifying agent, such as soap. My present invention is, therefore, an improvement thereof. It can be adapted to a large majority of oleaginous materials as the addition of soap or other emulsifying agent is controllable and the elimination of these agents can be carried out more readily.

My invention is especially suitable for fresh or semi-fresh oleaginous materials with relatively high content of oil or fat and low content of proteins, such as coconut meat, palm fruits, animal tissues, oily sludges and the like. The laceration of the tissues is rendered possible not by the mere removal of oil or fat and albuminous matters from the outer surfaces of the finely divided materials, but by the total release of these ingredients from the inner parts of the tissues or cells as a result of penetration of the extracting medium which reaches those parts.

In order to ensure maximum recovery of the fatty oils, proteins and carbohydrates, it will be necessary to employ a suitable strength of the emulsifying agent, with or without the aid of another agent capable of dissolving out the proteins and/or carbohydrates, and maintain the emulsion for at least so long until the meal residue has been separated.

A modification of my process is to subject the finely flaked oleaginous materials, such as coconut, groundnut, candlenut, soyabean, cottonseed, rubberseed, and the like, to countercurrent lixiviation with an aqueous medium containing soap or other water-soluble colloid serving as emulsifying agent for oil-in-water emulsions, so that the extraction may be continuous and uninterrupted.

My invention is embodied in a process which comprises treating oleaginous materials in an aqueous medium containing such a small amout of soap or other water-soluble emulsifier as will bring about the collapse of the fibrous or tissue structure in the hot or at ordinary temperatures and form a temporarily stable emulsion, separating the emulsion from the residues, preferably before the fatty oil begins to set itself free, treating the emulsion and residue in appropriate manners so as to isolate the fatty oil, proteins and carbohydrates quantitatively and break down the meal residue to a mere fibrous waste.

In carrying out the invention batchwise or continuously it is important to adhere to the optimum range of soap content which lies somewhere betwen 0.25 and 0.75 percent, based on average materials. Thus, for every 1000 parts of an aqueous medium, 2.5 to 7.5 parts of soap flakes are required. However, it may sometimes be necessary to employ a slightly higher or lower strength than this range, since the oleaginous materials vary greatly in freshness and composition. As a rule, preliminary tests have to be carried out so as to ascertain the optimum strength for a given material. It is safer to proceed with a series of strengths, say between 0.5 and 1.5 percent, and see which strength would be most suitable. A stronger solution tends to produce a richer emulsion, but the danger of a permanent emulsion being formed by the use of an excessive amount of soap, such as sometimes encountered in oil refining practice, should not be overlooked. Generally speaking, it is more advisable to use twice as much 0.5 percent soap solution for extraction as the quantity required for 1.0 percent solution. Moreover, some emulsifiers are more active or efficient than others, so that no fixed and fast rules may be laid down. When the extracting medium contains a proteins or carbohydrates solubilizing agent or any other aid to promote the laceration of the fibrous structure, the amount of soap or other emulsifier may have to be adjusted.

As a specific example of one embodiment of the invention, let me take coconut flakes as the starting material. It contains 51.0% fat, 5.5% proteins, 10.0% carbohydrates, 19.5% water and 14.0% fibre, so that out of 1000 lbs. of coconut flakes about 500 lbs. fat, 50 lbs. proteins and 95 lbs. carbohydrates may be obtained, in addition to roughly 150 lbs. moisture-free crude fibres, assuming some losses of the three basic ingredients.

To proceed with, 500 gallons of a 0.5% soap solution are gradually warmed up to 75° C. and allowed to lixiviate the 1000 lbs. of finely flaked coconut meat, with intense stirring, for about half an hour or longer, care being taken that the lixiviation temperature does not exceed the coagulation temperature of the proteins. As the lixiviation goes on, the clear sud of soap gradually becomes opalescent and the end point is reached when the extract has become very milky in appearance. The milky extract may be discharged straightly into a basket centrifuge or a screening separator, to separate the thick milk from the meal residue. Now the meal residue is soaked into a fresh extracting medium or a modified bath containing added salt to help dissolve the proteins still retained in the residue, a further recovery of the fatty oil, proteins and carbohydrates may be expected. By repeating the operation it is possible to obtain maximum yields which are nearly quantitative.

The milky extracts thus obtained may be treated in appropriate manner, such as by settling controlled flocculation, adjustment of the pH value, and by creaming with the aid of a creaming agent, such as acid or calcium salt, which tends to destroy the soap or other emulsifying agent which has been added to the aqueous medium, to separate the fatty oil, proteins and carbohydrates. The fatty oil thus liberated from the emulsion may be washed, filtered and heated up to improve its keeping quality, while the proteins separated out may be redissolved in a salt solution and then peptized, flocculated or dialyzed out in the pure state. The soluble carbohydrates as well as the ingredients in solution are treated further in the known manner. The meal residues have to be rinsed thoroughly to remove any soap contained therein and dried up. The wash liquors may be used for preparing new extracting medium, while the waste liquors derived from extraction and containing any free emulsifier may be circulated after replenishment for use again.

In carrying out my invention batchwise or continuously, such as by countercurrent lixiviation, it is important to employ the extracting medium in sufficient excess. The ratio by weight of moist meal to medium may vary between 1:5 and 1:60, according to the bulk and also the obsorptivity of the oleaginous materials to be treated.

It will be appreciated that by the use of an extracting medium containing an emulsifier of edible or inedible type, other soluble ingredients such as sterols, phosphatides, vitamins, pigments or alkaloids are also removed out, so that my invention may be adopted if desired as a preliminary method for the extraction of such ingredients from the oleaginous materials.

I claim:

1. The process of treating an oleaginous material selected from the group consisting of coconut, groundnut, candlenut, soybean, cottonseed and rubber seed, which comprises extracting a flaked form of the selected material with a 0.5 to 1.5% aqueous soap solution at an elevated temperature of at least 70° C. but not exceeding the coagulation temperature of the proteins of the material, maintaining said elevated temperature for at least half an hour to thereby form a temporary oil-in-water emulsion containing proteins and carbohydrates with fibrous and insoluble material, separating the fibrous and insoluble material from the emulsion and then separating the oil from the proteins and carbohydrates.

2. The process of treating an oleaginous material selected from the group consisting of coconut, groundnut, candlenut, soybean, cottonseed and rubber seed, which comprises extracting a flaked form of the selected material with a 0.5 to 1.5% aqueous soap solution at a temperature of from 70° to 80° C. to effect the desired extraction without coagulation of the proteins of the material, maintaining the selected temperature for at least half an hour to thereby form a temporary oil-in-water emulsion containing proteins and carbohydrates with fibrous and insoluble material, separating the fibrous and insoluble material from the emulsion and then separating the oil from the proteins and carbohydrates.

3. The invention according to claim 2, with the additional steps of subjecting the fibrous and insoluble material to soaking in a fresh extracting medium containing salt to effect further recovery of fatty oil, proteins and carbohydrates.

4. The process of extracting oils, proteins and carbohydrates from coconut meats, which comprises lixiviating the coconut meats in finely flaked form with intense stirring in 500 gallons of an aqueous soap solution of at least 0.5% and not more than 1.5% strength for each one thousand pounds of coconut meats, elevating said solution to a temperature of at least 70° C. and not greater than that temperature at which the proteins of the material will coagulate and maintaining the solution at such elevated temperature for at least half an hour until the solution becomes emulsified as indicated by its assuming a milky appearance and a creamy consistency, then effecting the separation of the milky emulsified solution from the fibrous residue, allowing the separated milky emulsified solution to stand until the emulsion breaks, as indicated by the separation of the oil and the rise of the oil to the surface, then removing the separated oil from the solution to thereby separate the proteins and carbohydrates therefrom.

References Cited in the file of this patent

UNITED STATES PATENTS

| 313,665 | Greene | Mar. 10, 1885 |
| 1,794,105 | David et al. | Feb. 24, 1931 |
| 2,525,702 | Mattikow | Oct. 10, 1950 |

OTHER REFERENCES

Bailey: Oil and Fat Products, 1945, page 316.